United States Patent [19]

Cudmore

[11] 4,034,879
[45] July 12, 1977

[54] DEVICE FOR LOADING AND CARRYING BOATS ON TOP OF VEHICLES

[76] Inventor: Eric W. Cudmore, R.R. 1, Box 143, Walcott, Iowa 52773

[21] Appl. No.: 714,566

[22] Filed: Aug. 16, 1976

[51] Int. Cl.² .................................... B60R 9/00
[52] U.S. Cl. ............................. 214/450; 214/85.1
[58] Field of Search ............. 214/1 A, 85.1, 450; 224/42.1 H; 9/41

[56] References Cited
U.S. PATENT DOCUMENTS

| | | | |
|---|---|---|---|
| 3,452,893 | 7/1969 | Heflin | 214/450 |
| 3,679,080 | 7/1972 | Fulcher | 214/450 |
| 3,809,266 | 5/1974 | Salerni | 214/450 |
| 3,927,779 | 12/1975 | Johnson | 214/450 |

Primary Examiner—L. J. Paperner
Attorney, Agent, or Firm—Glenn H. Antrim

[57] ABSTRACT

An inner frame is telescopically positioned within an outer frame to be mounted horizontally on top of a vehicle. Folding rails for a ramp are pivotally joined to the rear end of the inner frame, and when the inner frame is extended, the ramp is positioned far enough back of a vehicle to permit a boat to be inverted while it is being supported on the top portion of the ramp. A carrier bar follows the rails and has, for connection to oarlocks, fastening means that permit a boat to be inverted easily by being rotated about the bar. The movements of the carrier bar and telescopic frame are controlled by winches.

7 Claims, 8 Drawing Figures

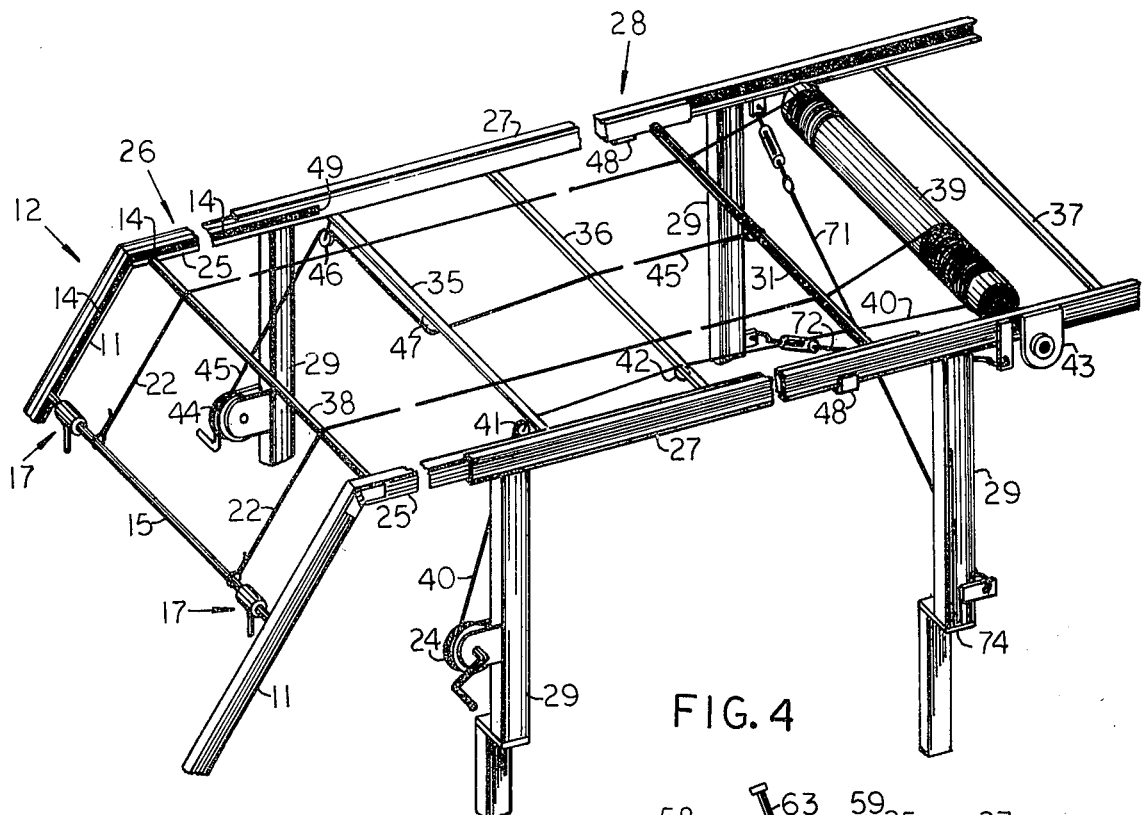
FIG. 4
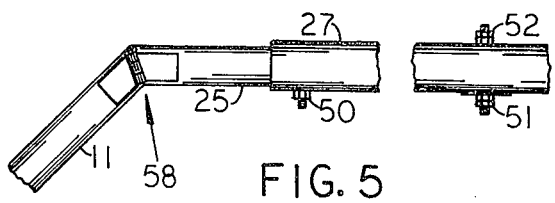
FIG. 5
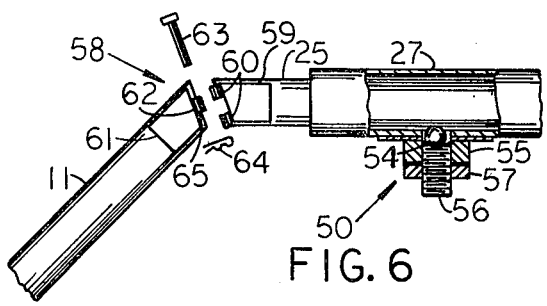
FIG. 6
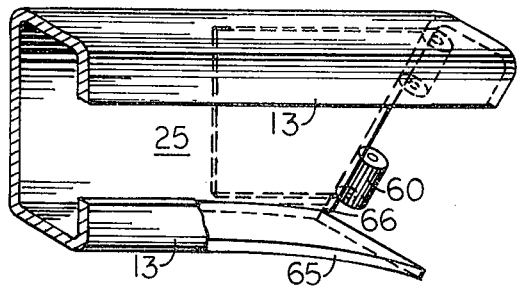
FIG. 7
FIG. 8

DEVICE FOR LOADING AND CARRYING BOATS ON TOP OF VEHICLES

BACKGROUND OF THE INVENTION

This invention relates to loading and carrying devices for securing loads to the tops of vehicles, and more particularly to devices that support loads to be inverted, loaded and carried on vehicles.

The smallest, lightest boats used for recreation can be quite readily inverted and loaded manually on top a vehicle such as a pickup, camper, automobile, or station wagon. Inverted boats are generally attached to carrier frames that have been secured to the tops of the carrying vehicles. To aid in loading larger boats, various arrangements of ramps have been connected to the rear portions of the top-mounted frames or carriers. The loading devices may require that wheels be attached to the boats such that the wheels follow the rails of the ramps while the boats are pulled up the ramps by cables. Since the general practice is to invert boats on carriers, the boats may be inverted before being pulled up the ramps. Except for the smallest boats, more than one person is required to invert each of the boats, and even two persons may have difficulty in loading a quite heavy fishing boat. Furthermore, a person who is partly disabled may need a mechanical loading device that is still easier to operate to load a boat of any size.

SUMMARY OF THE INVENTION

According to the present invention, a pair of folding rails for a ramp are connected to respective rear ends of telescopic rails of a top-mounted carrier. A carrier bar extends transversely between the rails and is movable along the rails. Fastening devices, to which a load is to be connected, are mounted to bearings that are rotatable about the carrier bar such that a load, for example a boat, that is attached to the fastening devices is largely supported on the rails as the load is inverted while it is far enough back of the vehicle and raised far enough to clear the ground. Through the use of the present device, a large boat that is too large for two persons to handle readily can be loaded by only one person.

To aid in inverting and loading boats and other loads, the present loading and carrying device features telescopic rails in the upper carrier frame to facilitate positioning the ramp at a distance from the rear of the vehicle on which the load is to be placed. After the load is inverted and moved forwardly on extended, telescopic rails, the telescopic rails are moved forwardly to position the load at a desired position over the vehicle. The rails of the ramp are preferably pivoted to the rear ends of the telescopic rails such that each of the rails of the ramp can be turned outwardly and forwardly about its pivot and fastened adjacent the respective outer, stationary rail of the carrier while the carrier is being transported.

BRIEF DESCRIPTION OF THE DRAWING

FIG. 4 is a top, rear perspective view of the loading and carrying device and winches to aid in the description of the movement of a carrier bar and the telescopic rails;

FIG. 5 is a fragmentary side view of an assembly of rails;

FIG. 6 is a detailed, side view of telescopic rails partly in cross-section;

FIG. 7 is a perspective view of an end of a telescopic rail; and

FIG. 8 is a cross-sectional view of a wheel or roller attached to the end of the carrier bar.

DESCRIPTION OF THE PREFERRED EMBODIMENT

Figure 1:
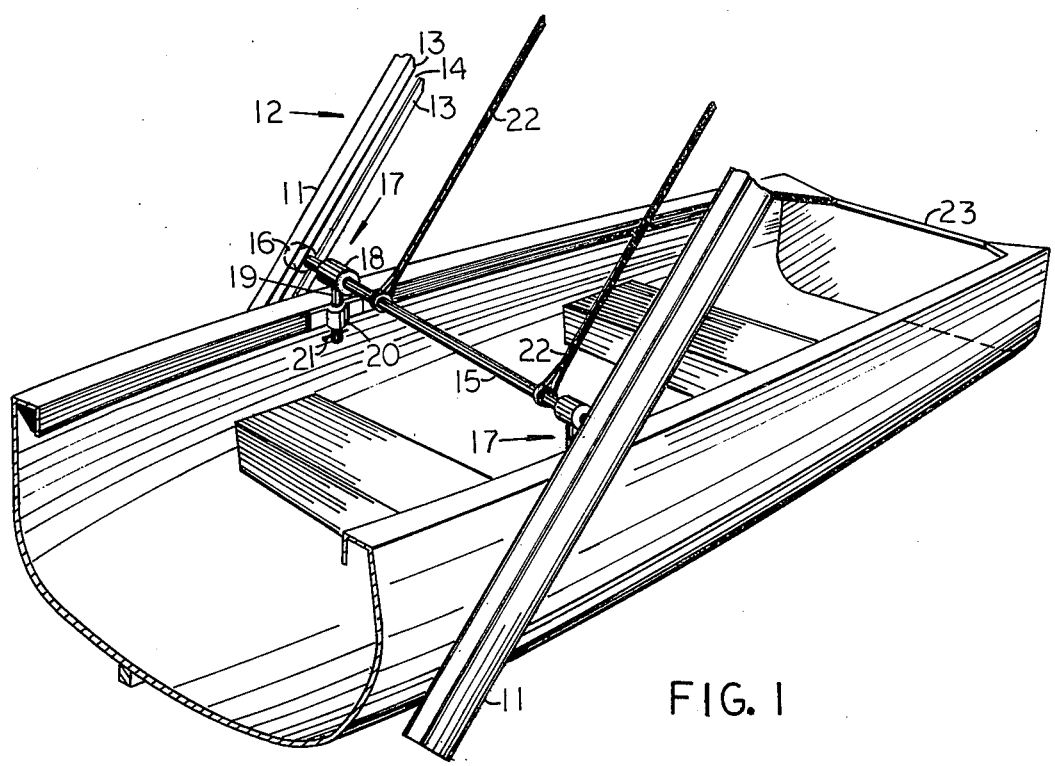
FIG. 1 is a fragmentary, top, oblique view of a boat positioned between rails of a ramp of the loading and carrying device of this invention.

To prepare for loading a boat, an upper carrier frame is extended, and side rails 11 of a ramp 12 are unfolded for straddling a boat 23 as shown in FIG. 1. The side rails 11 are fabricated from rectangular, steel tubing. A longitudinal strip has been removed from the center of that side of each rail that faces the opposite rail to leave strips 13 adjacent the edges of that side to form a T channel 14.

A carrier bar 15 extends between the parallel rails 11 and is long enough such that wheel, or roller, assemblies 16 that are fixed to the ends of the carrier bar 15 are contained within the channels 14 of the rails. As described in detail below, the wheel assemblies 16 are secured to the ends of the carrier rod 15. The diameter of the wheels of the assemblies are substantially greater than the distance across the channels between the opposite strips 13 of the rails 11 but less than the inside dimension between the opposite closed sides of the rails 11. With these dimensions, the wheel assemblies 16 are confined within the channels 14 but can roll freely along the rails 11.

Each of two fastening devices 17 for connecting the boat 23 to the carrier bar 15, includes a sleeve 18 that is a rotatable and a sliding fit on the carrier bar 15, and a bolt 19 that extends radially from the sleeve. The bolt 19 is the required size to fit through one of the oarlocks 20 of the boat 23, and it is provided with a hole through its outer end for receiving a hitch pin 21. The carrier bar 15 and the attached boat 23 are pulled upwardly along the rails 11 by two closely woven nylon ropes 22 connected near opposite ends of the carrier bar. For supplying upward force to the boat 23, the ropes are connected to a winch as described below.

Should a boat lack suitable oarlocks for receiving the bolts 19, the boat can be attached to the carrier bar 15 by the use of a strap encircling the boat, the strap having a suitable buckle for tightening. The strap can be positioned below and around the boat while the boat is in the water. Loads other than boats can also be loaded by straps or other holding means fastened to the carrier bar 15.

Figure 2:
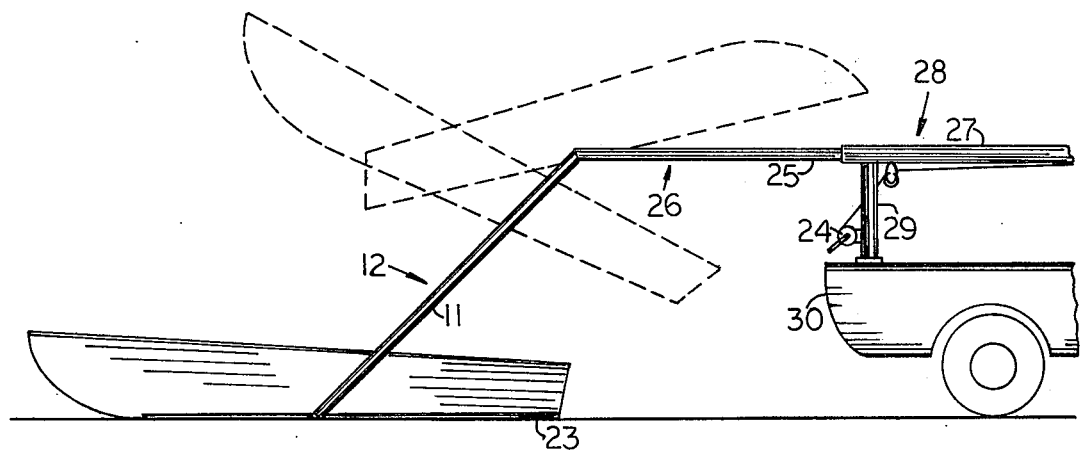
FIG. 2 is a side view of the ramp and a portion of the carrier to show the first successive positions of a boat that is being loaded.

In the side view of FIG. 2, the boat 23 as shown in full lines is in a normal upright position between the side rails 11 of the ramp 12 and connected to the carrier bar 15 as shown in FIG. 1. Through operation of a winch 24 to pull on the cables 22 of FIG. 1, the boat 23 is raised to the level shown in the dotted lines and held at that level by the carrier bar 15 while it is rotated to an inverted position. Each of the slanting side rails 11 of the ramp 12 are connected to a respective side rail 25 of a telescopic inner frame 26, and each side rail 25 is a sliding fit in a respective horizontal side rail 27 of an outer frame 28. The outer frame 28 is supported at a desired height above a pickup by vertical standards 29 that are inserted in stake-holders of a bed 30 of a pickup.

The boat 23 is maintained substantially horizontal while the winch 24 is operated to pull the carrier bar 15 and the attached 23 from the bottom of the ramp 12 to the top or nearly to the top of the side rails 11 of the ramp. While the reel of the winch 24 is locked to hold the carrier bar 15, the boat 23 is rotated to an inverted position by grasping the rear portion of the boat and pushing it downwardly and rearwardly to rotate the boat about the carrier bar 15 on the sleeves 18 of the fastening devices 17. After the boat 23 reaches a vertical position, a downward force is supplied to the rear of the boat to slow its movement while its bow comes to rest on a front cross member 31 (FIG. 4) of the inner frame 26.

Figure 3:
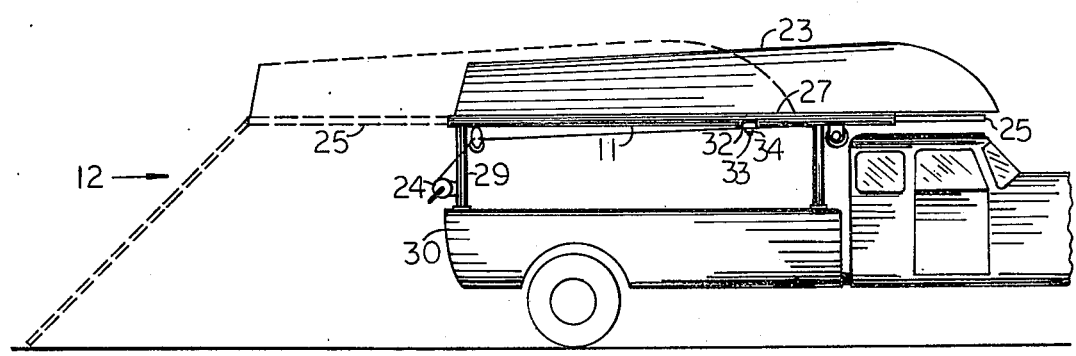
FIG. 3 is a side view of the loading and carrying device supporting an inverted boat, the boat and the rails being shown in dashed lines while telescopic rails are partly retracted and in full lines while the rails are fully retracted in position for transportation.

While the boat 23 is in a horizontal, inverted position on the inner frame 26, the winch 24 is operated to pull the carrier bar 15 forward within the inner frame. The boat 23 moves freely forward on the inner frame 26 for a distance equal to the length of the channels 14 (FIG. 4) within the rear portions of the side rails 25 of the inner frame 26. Typically, the length of these channels for accommodating a 16-foot boat is about 5 feet. After the carrier bar 15 has reached the limit of its forward travel at the end 49 (FIG. 4) of the channels 14, the carrier bar 15 exerts sufficient force forwardly on the inner frame 26 to move the inner frame with the boat 23 and the ramp 12 forwardly as shown in FIG. 3. The side rail 25 of the inner frame 26 as shown in dashed lines is partly retracted into the side rail 27 of the outer frame 28. The winch 24 continues to be operated until the side rail 25 is fully retracted such that its forward end as shown in the solid lines extends forwardly beyond the side rail 27 of the outer frame 28 and the bow of the boat 23 is positioned over the cab of the pickup.

Each of the side rails 11 of the ramp 12 is then brought outwardly and upwardly on a pivot that is described later to the position shown in the solid lines adjacent the side rail 27 of the outer frame 28. The end of the rail that is now forward is secured in a usual manner to the side rail 27. For example, a plate or a strip of steel 32 can be welded to the inside vertical surface in the end of a rail 11 such that it extends a short distance beyond the portion that forms the channel 14, and a bolt 33 can be inserted through a hole in the plate. An angle bracket 34 secured to the side rail 27 of the outer frame 28 receives the bolt, and the bolt is retained in the bracket by a thumb screw. The bolt 33 at the end of each of the side rails 11 also functions as a stop to prevent the roller 16 of that rail from falling out the end of the rail. The fastening of the end of the rail 11 not only maintains the rail in a folded position but also secures the inner frame 26 so it will not slide within the outer frame 28 while a load is being transported.

The construction of the frames and the operation of winches to move a load on the frames can be more readily understood by reference to FIG. 4. The loading and carrier device is shown after the side rails 11 of the ramp 12 have been unfolded from the position shown in FIG. 3, the inner frame 26 has been moved rearwardly until it is nearly fully extended, and the carrier bar 15 has been brought rearwardly and downwardly within the channel 14 to a position somewhat below the upper ends of the side rails 11. Rather than showing positions for normal use, the inner frame 26 and the carrier bar 15 have been placed in intermediate positions and the side rails 25 of the inner frame 26 have been cut away to simplify the drawing. When the inner frame 26 is fully extended and the carrier bar 15 is placed in a lower position, the loading and carrier device is in position to be connected to a boat or to another load.

The outer frame 28 is connected to the bed of a pickup by the four standards 29. If the frame 28 is to be connected to a camper or other vehicle, suitable standards 29 and fastening devices at the lower ends of the standards are provided. When a cover for the bed of a pickup is to be used or a camper is to be attached to the pickup, the standards 29 have respective outwardly extending offset portions 74 at the upper edge of the sides of the pickup bed to place the upper ends of the standards 28 along the sides of the cover or camper. The length of the standards is determined to place the outer frame 28 adjacent the top of the cover or the camper. The lower end of the standards below the offset portions 74 are connected by suitable means into the stake-holders of the pickup.

The outer frame 28 that is connected to the upper ends of the standards 29 comprises the two parallel side rails 27 and three cross members 35, 36, and 37. The cross members for the main frame are steel bars welded to the lower edges of the side rails 27. The cross member 35 is connected transversely near the rear ends of the side rails 27 and in addition to being a part of the structure of the frame, is utilized to support three pulleys as described below. The cross member 36 is connected between midpoint of the side rails 27, and the cross member 37 is connected across the front ends of the rails. Still another cross member may be required for supporting boats having bows that curve upwardly. A round cross member for supporting such boats may be welded to the upper sides of the side rails 27 of the outer frame 28 at required distance from the front ends of the rails. This cross member, rather than a lower cross member at the front end of the inner frame as described below, will then support the bow of the boat. To prevent the frame from swaying, especially when the loading and carrying device is being transported without a load, each one of crisscross cables 71 and 72 with a turnbuckle is connected between a bracket attached to a respective front standart just above the bed of a pickup and a bracket connected to the opposite rail 27 of the outer frame 28. The brackets are positioned such that the crisscross cables are between the cab and the bed of the pickup. Since the cross section of the inner surfaces of channel iron is not quite rectangular, steel tubing rather than channel iron has been used to fabricate the rails to obtain the desired rectangular cross section. The outer rails 27 have been made by cutting a length of 3½-inch × 3½-inch tubing lengthwise down the middle of opposite sides to provide both side rails.

The inner frame 26 comprises the pair of side rails 25 and a plurality of spaced cross members. Each of the side rails 25 is fabricated from a length of 3-inch × 2inch steel tubing. In typical loading and carrier devices for pickups, each of the side rails 25 is about 13 feet long, and a center strip about 5 feet long has been cut from the center of the inwardly facing side along the rear end of the rail to form an opening as part of the channel 14 along the strips 13 for travel of the carrier bar 15. A rear cross member 38 and a front cross member 31 connected between the rails 25 are fabricated from round rod. Intermediate cross members (not shown) fabricated from rectangular stock are used rigidity. required. Generally two intermediate members provide the required strength and rigiditly. Obviously, the length of the cross members 35, 36, and 37 of the outer frame 28 and the length of the cross members 31 and 38 of the inner frame 26 have been related to position this side rails 25 of the inner frame 26 as a sliding fit within the side rails 27 of the outer frame 28. As described below, ball bearings are mounted within the upper and lower sides of the side rails 27 to support the side rails 25.

The upward and forward movement of the carrier bar 15 and the forward movement of the inner frame 26 is controlled by the winch 24 through an intermediate roller 39, and the rearward movement of the inner frame 26 is controlled by a winch 44. The winch 24 is conveniently mounted on the rear side of the right, rear standard 29, and a closely woven nylon rope 40 extends from the winch upwardly to a pulley 41 that is connected to the lower side near the right end of the rear cross member 35 of the outer frame 28, forwardly through a pulley 42 connected to the lower side of the intermediate cross member 36, and continuing to the roller 39 connected transversely between the lower sides of the front ends of the side rails 27 of the outer frame 28. The pair of ropes 22 are also preferably closely woven nylon and extend from the carrier bar 15 upwardly over the round cross member 38 that is connected between the rear ends of the side rails 25 of the inner frame 26 and forwardly over other cross members of the main frame 28 but below the cross member 31 of the inner frame to the roller 39. The forward ends of the ropes 22 pass over the roller 39 at positions spaced somewhat from the respective ends of the roller, and the rope 40 from the winch 24 passes under the roller 39 so that it is wound in an opposite direction. The pulley 42 through which the rope 40 passes at the intermediate cross member 36 has its axis of rotation vertical, and is positioned on the cross member 36 far enough inwardly to cause the rope 40 to overlap before it runs off the end of the ruller 39.

The roller 39 can be 2-inch pipe with lengths of 1-inch pipe extending axially a short distance from its ends to provide a mounting shaft. The ends of the shaft of the roller 39 fit into a pair of sheet-type, self-aligning bearings 43 mounted to the lower portion of the outer edges of the respective side rails 27. The winch 44 is connected to the rear edge of the left, rear standard 29, and its rope 45 extends upwardly through a pulley 46 connected to the cross members 35 of the main frame 28, inwardly through a pulley 47 connected to the center of the same cross member, and forwardly to the center of the round cross member 31 across the end of the inner frame 26.

The operation of the winches 24 and 44 is shown most clearly by continuing to refer to FIG. 4 and assuming that a load is to be connected to the carrier bar 15. Before a boat is connected for loading, the carrier bar 15 is to be placed in the position shown in FIG. 1. To place the carrier bar 15 in that position, the bolt 33 (FIG. 3) at the end of each of the side rails 11 of the ramp 12 is disconnected from a respective side rail 27 of the outer frame 28 and each of the rails 11 is allowed to fall outwardly and downwardly into place at the rear of the vehicle. The winch 24 is unlocked, and the winch 44 is operated to pull rearwardly on the cross member 31 of the inner frame 26 until it engages a pair of stops 48 connected to the under side of each of the side rails 27 of the outer frame 28. Each of the stops 48 is a piece of iron bent at an angle such that the inner end is in the path of travel of the front cross member 31 of the inner frame 26. In FIG. 4, the cross member 31 has been shown in such a position that the inner frame 26 is nearly extended, but for simplicity, the side rails 25 of the inner frame have been cut away to show the ramp 12 close to the outer frame 28. After the inner frame 26 has been extended, the carrier bar 15 is pulled rearwardly, manually along the slots 14 of the side rails 25 of the inner frame 26 and downwardly along a continuation of the slots 14 in the side rails 11 of the ramp 12. As the carrier bar 15 is pulled rearwardly and downwardly, the ropes 22 wind on the roller 39 while the rope 40 unwinds therefrom.

As described previously with reference to FIG. 1, the boat 23 is connected by the fastening devices 17 to the carrier bar 15, and the winch 24 is operated to lift the boat to a position near the top of the ramp 12 where it is inverted as previously described while the winch 24 is locked. After the boat 23 is inverted, operation of the winch 24 is resumed until the carrier bar 15 is at the ends 49 of the open channels 14 of the side rails 25. While the winch 44 is unlocked, operation of the winch 24 is continued to telescope the rails 25 into the rails 27 until the pivot portions, positioned as described below between the horizontal side rails 25 and the side rails 11 of the ramp 12, function as stops against the ends of the side rails 27 of the outer frame 28. The winches 24 and 44 are then locked, and the rails 11 of the ramp 12 are folded and fastened as described above. The boat 23 is secure because the fastener 17 at its oarlocks holds the boat down while the cross members 38 and 31 on which the ends of the boat now rest prevent rotation of the boat about the carrier bar 15.

To unload a boat, the rails 11 of the ramp 12 are unfolded; the winch 24 is unlocked; and the winch 44 is operated to pull the inner frame 26 rearwardly until its front cross member 31 engages the stops 48. Then the boat is pulled manually rearwardly on the carrier bar 15 until the carrier bar is at the rear end of the side rails 27. As the carrier bar 15 approaches the rear of the side rails 25, the ropes 22 and 40 must be taut and the movement of the carrier bar 15 must be under the control of the winch 24. While the carrier bar 15 is at or near the top of the ramp 12, the reel of the winch 24 is locked, and the boat is turned to an upright, horizontal position. The winch 24 is now used as a brake to control the downward descent of the boat until it rests between the lower ends of the rails as shown in FIG. 1.

Details of assembly to aid in the smooth operation of the loading and carrier device are shown in FIGS. 5–8. Three bearing assemblies 50, 51, and 52 are positioned on each side rail 27 of the outer frame 28 as shown in FIG. 5. The bearing assemblies 50 and 51 are mounted on the lower side of a side rail 27 near the rear end and near the middle of the rail respectively. The bearing assembly 52 is mounted on the upper side of the side rail 27 above the bearing assembly 51. Each bearing assembly, as shown for bearing assembly 50 in FIG. 6, positions a ball 54 for spacing the upper and lower sides of a side rail 25 of the inner frame 26 from the adjacent sides of a side rail 27 of the outer frame 28. A machine nut 55 is welded to the lower side of a side rail 27 and a hole is drilled coaxial with the threaded hole in the nut through the bottom side of the rail. The diameter of the ball 54 is slightly smaller than the diameter of the inside thread of the nut 55 and the hole that is drilled through the side rail 27 is somewhat smaller than the diameter of the ball 54. The ball 54 is placed inside the nut 55 and a socket cap screw 56 is turned into the nut until the contained ball is positioned upwardly to provide a desired spacing between the rails 25 and 27. Preferably, a half-nut 57 adjacent the nut 55 is used to lock the cap screw 56.

As shown in FIGS. 5 and 6, each of the side rails 11 of the ramp 12 is pivoted on a hinge 58 to a respective side rail 25 of the inner frame. A plate 59 that is to be welded on the outer side at the end of a side rail 25 has two rollers 60 spaced apart and welded to a slanting edge of the plate 59 that is to be placed along an edge with a similar slant on the outwardly facing side of one of the side rails 25. The rollers 60 are welded to the plate 59 rather than directly to a rail 25 to prevent the weld from extending along the surface that is to meet with the mating slanting surface on a side rail 11 of the ramp 12. Similarly, the plate 61 with a single roller 62 that is to fit between the rollers 60 is welded to one of the side rails 11. The rollers 60 and 62 are aligned and assembled together with a bolt 63 in the same manner as a loose-pin door hinge. The lower end of the bolt 63 is provided with a hole for receiving a hitch pin 64. The mating lower edges 65 of the adjacent ends of both the side rails 11 and 25 are rolled downwardly sufficiently such that a gradual curve is obtained at the inside corner where the rails joint to provide a smooth track for the respective roller 16. As shown in FIG. 7, longitudinal cuts 66 are provided along the lower corners between the vertical sides of each of the side rails 11 and 25; the end of the lower side between the cuts 66 is rolled downwardly to form the curved portion 65; and then the corners are closed and strengthened by welding.

A recommended construction of rollers 16 to be mounted on the ends of the carrier bar 15 is shown on FIG. 8. The roller 16 is fabricated from rod having a diameter somewhat less than the inside dimension of the rectangular tubing used for the side rails 11 and 25. The carrier bar 15 may be fabricated from 1-inch rod, and the ends of the rod for receiving the rollers 16 may be turned down to a diameter of ¾-inch. Another rod of greater diameter for making rollers 16 is cut to provide for each roller a piece somewhat shorter than the inner width of the rails 11 and 25, and an axial bore of about ¾-inch is provided through each piece such that it will slide easily on an end of the carrier bar 15. The ¾-inch bores are provided with counter bores 67 into which are pressed respective bearing assemblies 68 that are then pressed tightly onto the ends of the carrier bar 15. Each end of the carrier bar 15 has an axial threaded hole for receiving a cap bolt 70. A washer 69 below the head of each of the bolts 70 retains the bearing assemblies 68 and the roller 16. The depths of the counter bores 67 are sufficient to insure that the outer ends of the rollers 16 extend beyond the heads of the respective bolts 70 to prevent the bolts from contacting the sides of the rails in which the rollers 16 are located.

By using the present loading and carrier device, quite large boats can be loaded by one person. For persons who are partly disabled, the loading of boats can be made still easier by having electrically operated winches for the winches 24 and 44. As described above, when the boat is unloaded, the boat has to be moved manually on the carrier bar 15 along the channel 14 at the rear of the side rail 25 of the inner frame 26. The boat can be pulled readwardly quite easily by most people, but a winch can be used for this purpose by those who lack the necessary strength or agility.

I claim:

1. A vehicle top-mounted load carrier comprising:
   an upper frame to be secured horizontally above a vehicle for supporting a load to be carried and a ramp extending slantingly downwardly from an end of said upper frame to facilitate loading, said upper frame and said ramp each having a pair of parallel side rails, the rails at each side being joined together end-to-end to provide a continuous rail,
   a carrier bar extending transversely between said continuous rails, each end of said carrier bar being constrained to follow the respective one of said continuous rails and being readily movable therealong,
   fastening means connected to said carrier bar for carrying a load to be attached thereto, said fastening means being rotatable on said carrier bar for permitting a load attached thereto to be rotated about said carrier bar to the extent of inverting the load to have a suitable portion of the load facing downwardly for subsequently supporting the load, the attached load being rotated while the load is suspended between opposite ones of said side rails at a position removed from the layer end of said ramp and from the vehicle to which the upper frame is attached,
   load propelling means connected to said carrier bar for moving said carrier bar along said continuous rails to move said attached load to a position over said frame,
   supporting means connected to said upper frame for securing said upper frame above a vehicle, and said frame having transverse members for supporting said attached load.

2. A vehicle top-mounted load carrier as claimed in claim 1 wherein said upper frame has an outer frame comprising an outer frame member on each side thereof into which a respective one of said of said side rails of said upper frame is a sliding telescopic fit, said side rails being rigidly connected together to form a movable inner frame with respect to said outer frame,
   driving means connected between said outer frame and said inner frame operable to extend said inner frame and thereby to increase the distance between said ramp and a vehicle to which said upper frame is secured, and said driving means operable to retract said inner frame substantially within said outer frame for use during transportation.

3. A vehicle top-mounted load carrier as claimed in claim 2 wherein each side rail of said ramp is joined by a slanting pivot to the respective side rail of said upper frame, each of said side rails of said ramp being foldable outwardly about said respective pivot to a position adjacent a respective one of said outer frame members, and fastening means between each of said side rails of said ramp and said adjacent outer frame member to be fastened while said inner frame is retracted to retain said ramp in a folded position.

4. A vehicle top-mounted load carrier comprising:
   an upper frame and a folding ramp extendable from the rear end of said upper frame, said upper frame and said ramp each having a pair of opposite parallel side members with channels facing each other, the rear end of each of said side members of said upper frame pivotally attached to the upper end of a respective one of said side members of said ramp such that while said ramp is unfolded a continuous inwardly facing channel is formed within at least the upper portion of each of said side members of said ramp and at least the rear portion of the respective one of said side members of said frame, a carrier bar extending transversely between said opposite continuous channels with the ends thereof supported within respective ones of said channels for supporting said carrier bar and any load attached thereto, bearing means on each end of said carrier bar permitting said carrier bar to be freely movable along said continuous channels while said carrier bar is maintained perpendicular to said side members, load propelling means connected to said carrier bar for moving said bar along said continuous channels, and supporting means for attaching said upper frame to a vehicle to support said upper frame above the vehicle, each of said side members of said upper frame comprises an outer frame member connected rigidly to said supporting means and an inner frame member telescopically mounted within the respective one of said outer frame members, said side members of said ramp being pivotally attached to respective ones of said inner frame members, rearwardly propelling means for moving said inner frame members rearwardly to etend substantially beyond the rear portion of said outer frame members, and forwardly propelling means for telescoping said inner frame members until said inner frame members are positioned substantially within said outer frame members.

5. A vehicle top-mounted load carrier as claimed in claim 4 having a pair of bolts adapted to be fastened in the oarlocks of a boat, a sleeve connected to each of said bolts, said sleeves being rotatably mounted about said carrier bar and spaced apart a distance equal to the distance between opposite oarlocks of a boat to be carried as said load, said sleeves facilitating rotation of a boat fastened thereto from a normal horizontal position to an inverted position while said carrier bar is supported high enough by said load propelling means to permit the boat to be turned freely about said carrier bar, and crossbars connected between said upper frame to aid in supporting the boat to be carried in an inverted position.

6. A vehicle top-mounted load carrier as claimed in claim 5 having a slanting pivot connecting each of said side members of said ramp to the rear end of a respective one of said inner frame members, each of said side members of said ramp being foldable outwardly about said respective pivot to a position adjacent a respective one of said outer frame members, fastening means between said side member of said of said ramps and said respective adjacent outer frame members, said fastening means to be fastened to retain said side members of said ramp in a folded position and to fix said inner frame members with respct to said outer frame members.

7. A vehicle top-mounted load carrier as claimed in claim 5 wherein said sleeves are movable along said carrier bar to change the distance between said bolts to accommodate different boats with different distances between the oarlocks thereof.

* * * * *

UNITED STATES PATENT OFFICE
CERTIFICATE OF CORRECTION

Patent No. 4,034,879          Dated July 12, 1977

Inventor(s) Eric W. Cudmore

It is certified that error appears in the above-identified patent and that said Letters Patent are hereby corrected as shown below:

Column 3, line 9, after "attached", insert -- boat --. Column 4, line 20, "28" should read -- 29 --; line 49, "standart" should read -- standard --; line 64, "2inch" should read -- 2-inch --. Column 5, line 6 "rigidity. required" should read -- as required --; line 7, "rigiditly" should read -- rigidity --; line 11, "this" should read -- the --. Column 7, line 32, "joint" should read -- join --; line 59, "roller" should read -- rollers --. Column 8, line 30, "layer" should read -- lower --. Column 9, line 32, "etend" should read -- extend --. Column 10, line 24, "said of said ramps" should read -- each of said ramps --, line 28, "respct" should read -- respect --.

Signed and Sealed this

Twenty-fifth Day of October 1977

[SEAL]

Attest:

RUTH C. MASON
*Attesting Officer*

LUTRELLE F. PARKER
*Acting Commissioner of Patents and Trademarks*